United States Patent [19]

Mukaida

[11] 4,185,794
[45] Jan. 29, 1980

[54] GEAR-DRIVEN CHANGE-OVER MECHANISM

[75] Inventor: Kumio Mukaida, Tokyo, Japan

[73] Assignee: Sony Corporation, Tokyo, Japan

[21] Appl. No.: 933,523

[22] Filed: Aug. 14, 1978

[30] Foreign Application Priority Data

Aug. 20, 1977 [JP] Japan .................................. 52/99944

[51] Int. Cl.² ...................... G11B 15/30; G11B 15/44
[52] U.S. Cl. .................................. 242/201; 242/208; 242/209
[58] Field of Search ................................ 242/200-204, 242/206, 208, 209, 210; 360/96, 71, 74, 93, 94

[56] References Cited

U.S. PATENT DOCUMENTS

| 3,818,504 | 6/1974 | Schroeder | 360/96 |
| 3,900,173 | 8/1975 | Ketzer | 242/201 |
| 3,997,129 | 12/1976 | Ban et al. | 242/201 |
| 4,014,041 | 3/1977 | Cicatelli | 360/96 |

Primary Examiner—Stanley N. Gilreath
Attorney, Agent, or Firm—Lewis H. Eslinger; Alvin Sinderbrand

[57] ABSTRACT

A gear-driven change-over mechanism adapted for use in a tape recorder and/or reproducing apparatus includes an operating push-button, a main lever which is movable upon depression of the push-button, a rotary plate which rotates with the movement of the main lever, a transmission plate which is rotated by the rotary plate by an interconnecting torsion spring, a first gear supported on the transmission plate, a stop lever to stop the rotation of the transmission plate which is moved with the movement of the main lever and a second gear engageable by the first gear. In the gear-driven change-over mechanism the rotary and transmission plates are rotated to a first position when the push-button is depressed and the main lever is moved to a first operative position where the rotation of the transmission plate is stopped by the stop lever. The rotary plate continues to rotate against urging force of the interconnecting torsion spring while the main lever continues to move to a second operative position where the transmission plate is released from the stop lever to allow the first gear to engage and drive the second gear under the urging of the torsion spring.

7 Claims, 7 Drawing Figures

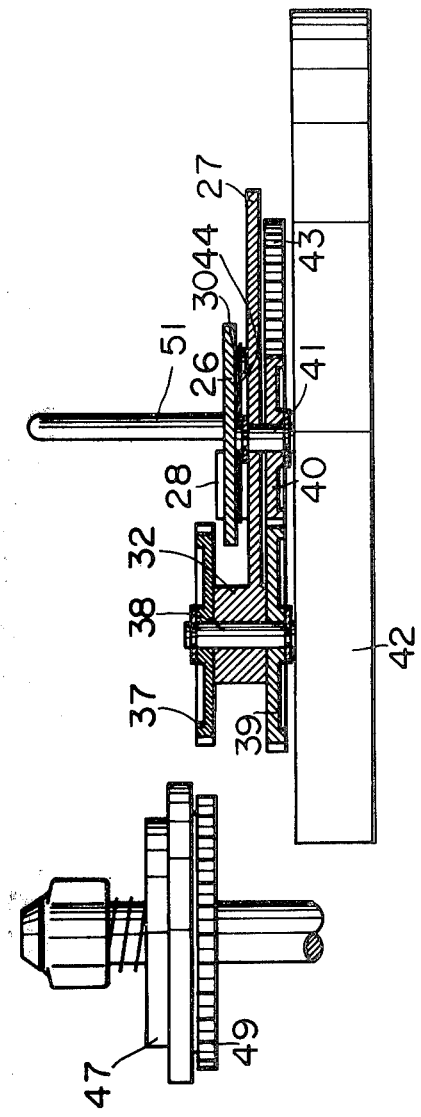

GEAR-DRIVEN CHANGE-OVER MECHANISM

BACKGROUND OF THE INVENTION

1. Field of the Invention

This invention relates to a gear-driven change-over mechanism, and more particularly to a gear-driven change-over mechanism adapted for use in a tape recording and/or reproducing apparatus.

2. Description of the Prior Art

In certain prior art tape recording and/or reproducing apparatus magnetic tape is transported at a higher speed in the fast-forward and rewind modes than in the reproducing or record modes. When a fast-forward push-button is depressed, change-over gears are engaged with a gear fixed on a take-up reel mount and another gear fixed on a capstan. Thus, the rotation of the capstan is transmitted through the change-over gears to the take-up reel mount and the magnetic tape is transported at the higher speed. In a like manner, when a rewind push-button is depressed, the change-over gears are engaged with a gear fixed on a supply reel mount and another gear fixed on the capstan so that the rotation of the capstan is transmitted through the change-over gears to the supply reel mount to transport the magnetic tape at the higher speed in the opposite direction to the transporting direction for the fast forward mode.

In tape recorders of the type described above when the fast-forward or rewind push-button is depressed to place the recorder in the fast-forward or rewind modes, the change-over gears are moved into engagement with the take-up or supply reel mount and the capstan by means of levers, cams and other linkages which are interconnected with the fast-forward or rewind push-buttons. With such an interconnecting mechanism the change-over gears move in response to the pushing stroke of the fast-forward or rewind push-buttons. Thus, when the push-button is pushed slowly the change-over gears are similarly moved and approach the take-up or supply reel gear and the capstan gear slowly. In such a case, the change-over gears are transiently and incompletely engaged with the take-up or supply reel gears and the capstan gear so that some rub between the gears occurs to make a gear noise. Moreover, such an action has the tendency to wear the gears. Further, even when the push-button is pushed rapidly it is difficult to avoid the above-noted gear noise.

The above-described problem is not limited to the gear-driven change-over mechanism for a tape recorder. It often arises generally in any gear-driven change-over mechanism in which one gear is moved into engagement with another gear.

SUMMARY OF THE INVENTION

Accordingly, it is an object of this invention to provide a gear-driven change-over mechanism which overcomes the above described problem.

Another object of this invention is to provide a gear-driven change-over mechanism which is suitable for a tape recorder.

In accordance with an aspect of this invention, a gear-driven change-over mechanism includes a push-button, an operating member moved with the depression of the push-button, a rotary member rotated with the movement of the operating member, a transmission member, a spring means interconnected between the rotary member and the transmission member such that the transmission member is rotated by the rotary member through the spring means, at least one gear supported by the transmission member, a stop member moved with the movement of the operating member, to stop the rotation of the transmission member, and a second gear. The rotary and transmission members are rotated to respective first positions from respective original positions by the movement of the operating member to its first operative position. The transmission member is stopped at its first position by the stop member while only the rotary member is rotated against the spring means to its second position from its first position while the operating member confines its movement to its second operating position against the spring means. The transmission member is released from the stop member when the operating member reaches its second operative position to rapidly engage the first gear with the second gear to rotate the second gear with the discharge of the energy charged in the spring means.

Various other objects, advantages and features of the present invention will become readily apparent from the ensuing detailed description viewed in conjunction with the accompanying drawing, and the novel features will be particularly pointed out in the appended claims.

BRIEF DESCRIPTION OF THE DRAWINGS

FIG. 7 is a cross-sectional view of a part of the gear-driven change-over mechanism, taken along the line VII—VII of FIG. 1.

DESCRIPTION OF THE PREFERRED EMBODIMENTS

The gear-driven change-over mechanism according to one embodiment of this invention will be described with respect to a cassette-type tape recorder.

Figure 1:
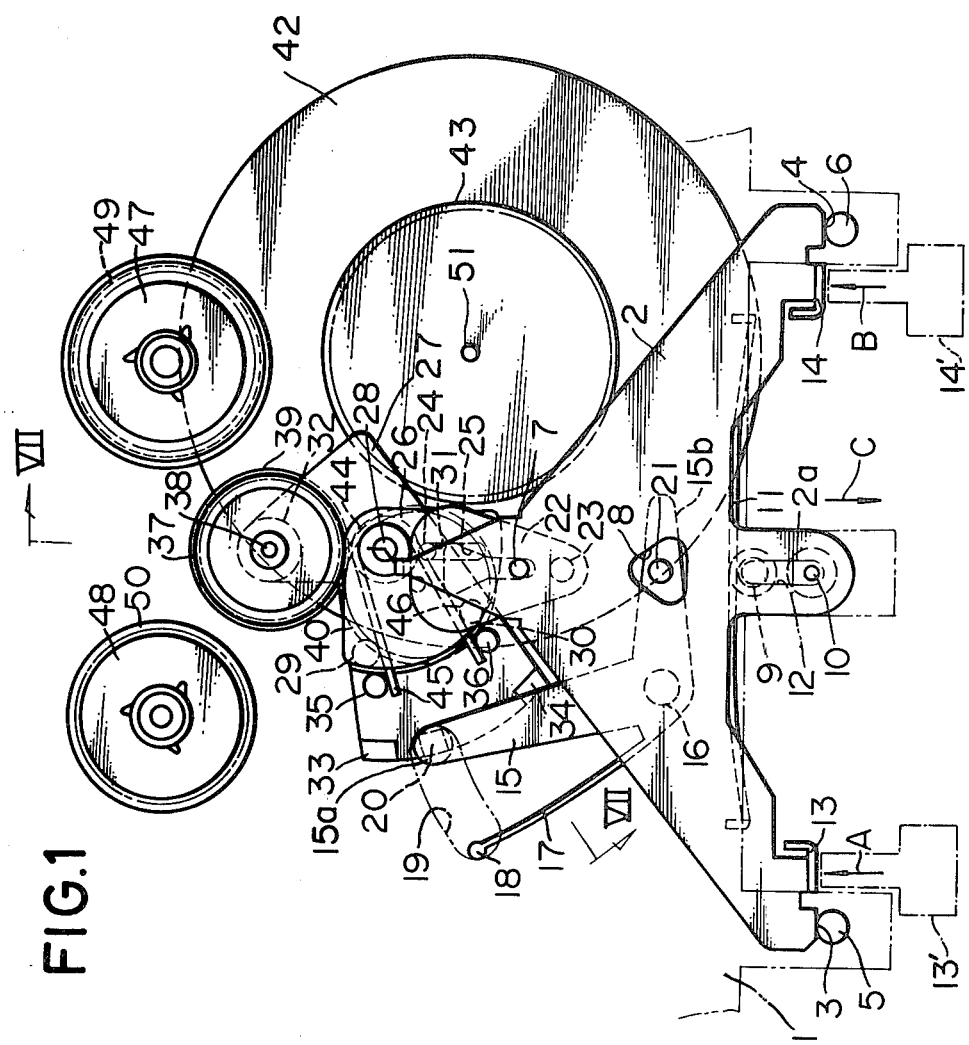
FIG. 1 is a plan view of a gear-driven change-over mechanism of a tape recorder according to one embodiment of this invention, in which the gear-driven change-over mechanism is in the rest position before the rewind operation or fast-forward operation is selected.

Referring to FIG. 1, a main lever 2 which is substantially triangular in shape is arranged on a mechanical chassis 1 of the recorder. A left corner portion 3 of the main lever 2 and a right corner portion 4 thereof contact with upstanding pins 5 and 6, respectively, mounted on chassis 1. A downwardly extending engaging pin 7 extends from the top portion of main lever 2 and a substantially triangular opening 8 is provided in the central portion of main lever 2. Main lever 2 also includes a centrally located projection 2a on which are mounted downwardly projecting pins 9 and 10. A torsion spring 11 is wound on pin 9 and each end of torsion spring 11 is fixed on the edge portion of chassis 1 so as to urge main lever 2 in the direction shown by the arrow C in FIG. 1. Pin 10 is loosely fitted into an oblong hole 12 formed in chassis 1.

An actuating portion 13 for the rewind mode and another actuating portion 14 for the fast-forward mode of the recorder are formed integrally with the main lever 2 near the left corner portion 3 and the right corner portion 4, respectively. Actuating portion 13 is interlocked with a rewind push-button 13' so that depression of the rewind push-button moves actuating portion 13 in the direction shown by the arrow in FIG. 1. In like manner, actuating portion 14 is interlocked with a fast-forward push-button 14' and moves in the direction shown by the arrow B in FIG. 1 with the depression of the fast-forward push button.

A generally L-shaped stop lever 15 preferably formed of a synthetic resin material is also provided and is pivotally mounted on chassis 1 by a pin 16 fixed on chassis 1. A slender spring action portion 17 is formed integrally with stop lever 15 and includes a pin 18 fixed on the top end of slender spring action portion 17 which elastically contacts with one end of an oblong hole 19 formed in chassis 1 so that stop lever 15 is urged to pivot in the clockwise direction as viewed in FIG. 1 about support pin 16. A pin 20 having a square cross-section is fixed on one end 15a of stop lever 15 and extends downwardly through oblong hole 19 in chassis 1. An engaging pin 21 is fixed on the other end 15b of stop lever 15 and extends upwardly through triangular opening 8 in main lever 2.

A generally inverted triangular-shaped drive plate 22 is also provided facing the top portion of lever 2 and is rotably supported on chassis 1 by a pin 23. Drive plate 22 includes a downwardly extending pin 24 and a keyhole-shaped guide hole 25 formed in the central portion of the drive plate in which is received pin 7 extending from main lever 2.

In addition, a rotary plate 26, having a shape generally conforming to a section of a circle, and a transmission plate 27 are each independently rotatably supported by a common shaft 28 extending from chassis 1. Rotary plate 26 also includes downwardly extending spring-stop pins 29 and 30 fixed on the peripheral portion of rotary plate 26. An oblong hole 31 is also formed in rotary plate 26 near one side edge in which is received pin 24 extending from drive plate 22.

A circular projection or boss 32 is formed on one corner of transmission plate 27 and projections 33 and 34, which are substantially rectangular in cross-section, are formed on the other corners of transmission plate 27. Projections 33 and 34 are contacted by pin 20 of stop lever 15 as will be described more fully hereinafter. Spring-stop pins 35 and 36 are also provided on transmission plate 27 and are upwardly disposed to face spring-stop pins 29 and 30 on rotary plate 26 in the stop mode of the gear-driven change-over mechanism (FIG. 1).

A pair of transmission gears 37 and 39 are fixed at each end of a shaft 38 which is rotatably journalled within circular boss 32 formed on transmission plate 27 (see FIG. 7). In addition, a transmission gear 40 is rotatably supported on a shaft 41 fixed on transmission plate 27. In the operation to be described hereinafter, transmission gears 39 and 40 are selectively engaged with a drive gear 43 which is concentrically disposed with fly wheel 42 and capstan 51.

A U-shaped torsion spring 44 is wound about the common shaft 28 which rotatably supports transmission plate 27 and rotary plate 26. As seen in FIG. 1, one leg 45 of spring 44 contacts pin 35 of transmission plate 27 and pin 29 of rotary plate 26 and another leg 46 of torsion spring 44 contacts pin 36 of transmission plate 27 and pin 30 of rotary plate 26. Torsion spring 44 is compressed between the pair of pins 29 and 35 and the other pair of pins 30 and 36 in the rest position of the change-over mechanism as shown in FIG. 1.

The recorder also includes a take-up reel mount 47 and a supply reel mount 48 which are respectively rotatably supported on chassis 1. Gears 49 and 50 are fixed to the shafts of take-up reel mount 47 and supply reel mount 48, respectively.

The above-described parts of the gear-driven change-over mechanism are arranged above or below the chassis. For example, main lever 2, stop lever 15, drive plate 22, transmission gear 37 and reel mounts 47 and 48 are arranged above chassis 1 and rotary plate 26, transmission plate 27 and gears 39 and 40 are arranged below chassis 1.

Next, the rewind operation of the above described gear-driven change-over mechanism and the fast-forward operation thereof will be described with reference to FIGS. 2 to 5.

Figure 2:
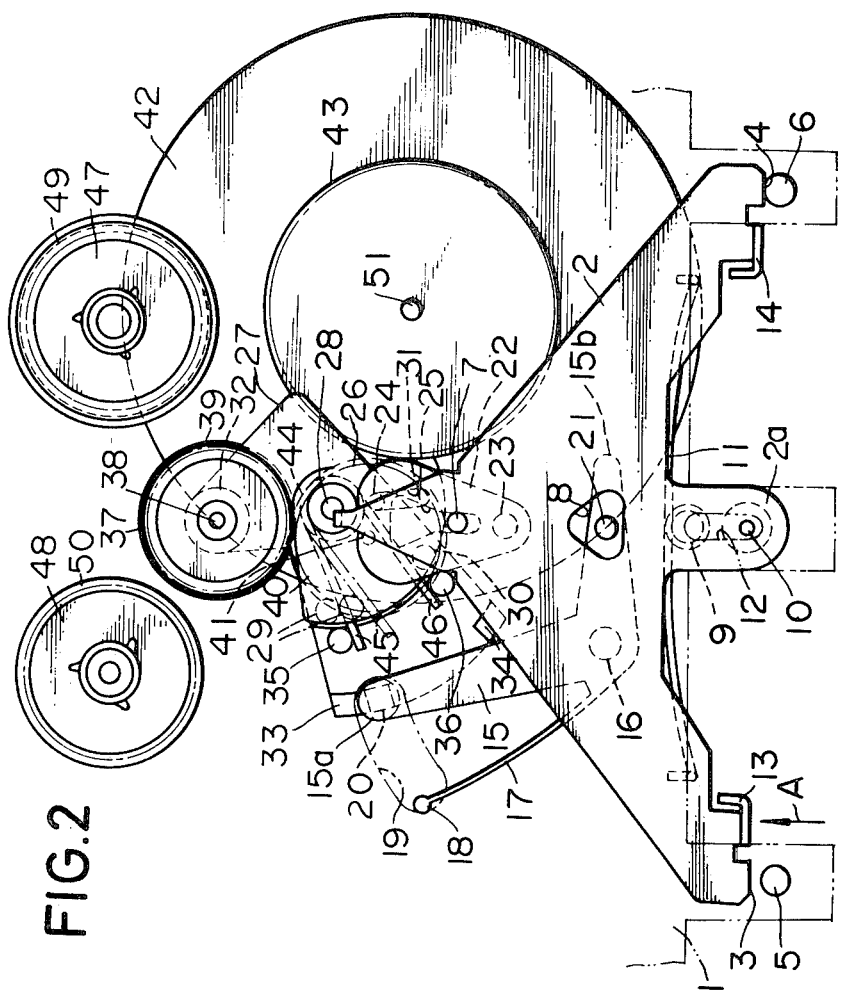
FIG. 2 is a plan view of the gear-driven change-over mechanism in an intermediate position between the rest position and the rewind mode.

In the arrangements as shown in FIG. 1, upon the initial depression of the rewind push-button 13', actuating portion 13 of main lever 2 is pushed in the direction shown by arrow A. The left corner portion 3 of main lever 2 is separated from contact with pin 5 fixed on chassis 1 and main lever 2 is rotated to the position shown in FIG. 2 in a clockwise direction about the contact point between right corner portion 4 of main lever 2 and pin 6 fixed on chassis 1 against the urging force of torsion spring 11 wound on pin 9. During this rotation main lever 2 is guided by the engagement of pin 10 within oblong hole 12 into which pin 10 is loosely fitted. Drive plate 22 is also rotated in the clockwise direction as viewed in FIG. 2 about support pin 23 with pin 7 fitted into guide hole 25 of drive plate 22. With this clockwise rotation of drive plate 22, rotary plate 26 is rotated in the counter-clockwise direction as viewed in FIG. 2 about common shaft 28 through the engagement of pin 24 within oblong hole 31 of rotary plate 26. With the rotation of rotary plate 26, pin 29 of rotary plate 26 pushes leg 45 of spring 44 to rotate the latter in the counter-clockwise direction about shaft 28. Accordingly, pin 36 of transmission plate 27 is pushed by leg 46 of spring 44 to rotate transmission plate 27 in the counter-clockwise direction about shaft 28. The rotation of transmission plate 27 is temporarily interrupted by the contact of projection 33 of transmission plate 27 with stop 20 fixed on the top of stop lever 15, as shown in FIG. 2. In this state as shown in FIG. 2, first transmission gear 37 supported by transmission plate 27 is placed in an intermediate position close to gear 50 on supply reel mount 48 and second transmission gear 40, also supported by transmission plate 27 is placed in an intermediate position close to gear 43 concentric to fly wheel 42. The lower side of triangular opening 8 in main lever 2 is placed in an intermediate position close to pin 21 projecting from end 15b of stop lever 15.

With the further depression of the rewind push-button 13', main lever 2 is rotated further in the clockwise direction about the contact point between right corner portion 4 and pin 6 fixed on chassis 1. However, transmission plate 27 is prevented from further rotation by the engagement of projection 33 of transmission plate 27 with stop 20 of stop lever 15. Accordingly, upon the further rotation of main lever 2 only rotary plate 26 is rotated through drive plate 22 in the counter-clockwise direction about shaft 28 resulting in leg 45 of spring 44 being pushed by pin 29 of rotary plate 26. However, spring 44 is not rotated round shaft 28 since leg 46 of spring 44 is stopped by pin 36 of transmission plate 27 which is prevented from rotating. Accordingly, leg 45 of spring 44 bends in the manner shown by the dot-dash line in FIG. 2.

With the rotation of main lever 2 while leg 45 of spring 44 bends, pin 21 fixed on end portion 15b of stop lever 15 contacts the lower side of triangular opening 8 in main lever 2 and pin 21 is pushed upwardly as viewed in FIG. 2 by the lower side of triangular opening 8 of main lever 2 to rotate stop lever 15 in the counter-clockwise direction about support pin 16 against spring action portion 17. The contact area between projection 33 of transmission plate 27 and stop 20 of stop lever 15 gradually decreases with the rotation of stop lever 15 while transmission plate 27 is prevented from rotating and leg 45 of spring 44 bends more and more with the decrease of the contact area between projection 33 and stop 20.

As main lever 2 continues to rotate stop lever 15 is also further rotated to disengage projection 33 of transmission plate 27 from stop 20 on stop lever 15. Accordingly transmission plate 27 rotates in the counter-clockwise direction as viewed in FIG. 2 due to the energy charged in spring 44 which now causes transmission plate 27 to rapidly rotate in the counter-clockwise direction. With the rapid rotation of transmission plate 27, first transmission gear 37 is instantaneously engaged with gear 50 of supply reel mount 48 and substantially at the same time, second transmission gear 40 is instantaneously engaged with gear 43 fixed on the shaft supporting fly wheel 42 as shown in FIG. 3.

Figure 3:
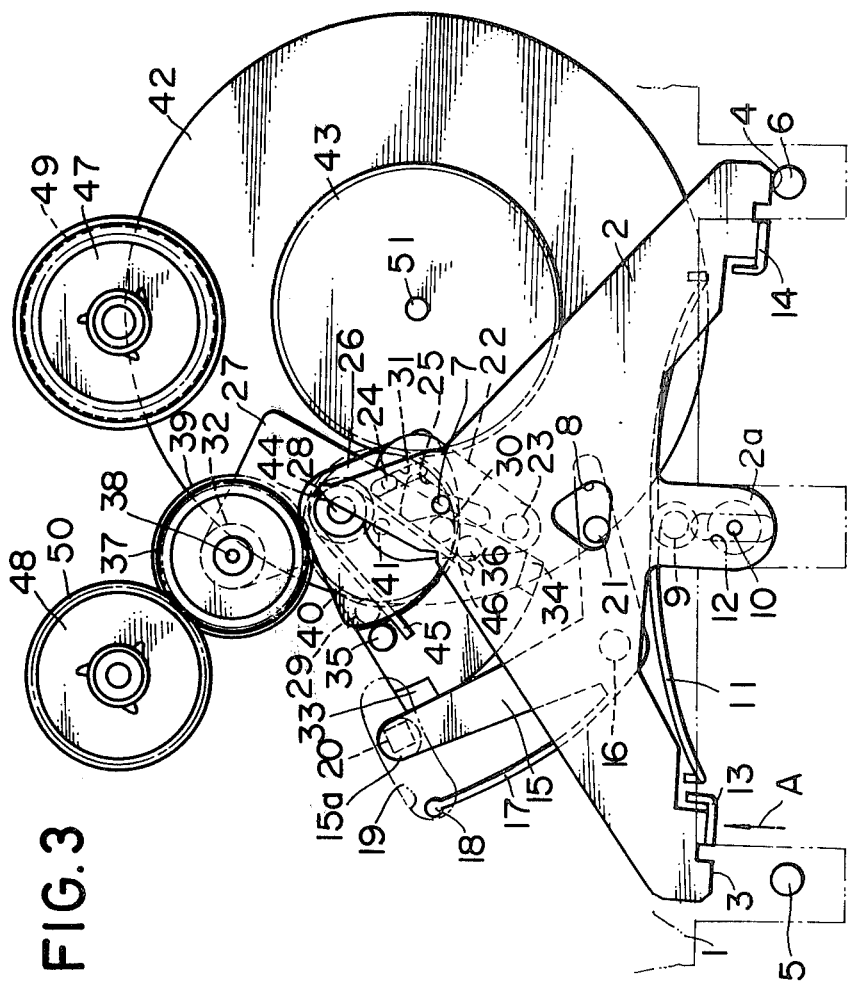
FIG. 3 is a plan view of the gear-driven change-over mechanism in the rewind mode.

In the rewind state of the gear-driven change-over mechanism shown in FIG. 3 the rotation of fly wheel 42 is transmitted through gears 43, 40, 39 and 37 to gear 50 of supply reel mount 48 which then rotates at high speed to rewind tape in the recorder.

When the rewind push-button 13' is released from its depressed state in the rewind condition shown in FIG. 3, main lever 2 is rotated counterclockwise back to its original position under the urging of torsion spring 11. Accordingly, drive plate 22, interconnected through pin 7 and guide hole 25 with main lever 2, is also rotated in the counter-clockwise direction back to its original position and, thus, rotary plate 26 and transmission plate 27 are also rotated in the clockwise direction back to their respective original positions. As a result, first transmission gear 37 is disengaged from gear 50 of supply reel mount 48 and second transmission gear 40 is disengaged from gear 43 fixed on the shaft of fly wheel 42. In addition, stop lever 15 is rotated in the clockwise direction back to its original position shown in FIG. 1 under the urging of spring action portion 17, since pin 21 fixed on end portion 15b of stop lever 15 is released from its engagement with the lower side of triangular opening 8 of main lever 2.

As described above, when the rewind push-button 13' is pushed to rotate main lever 2 from its original position shown in FIG. 1 to the operative position shown in FIG. 3, initially, first transmission gear 37 and second transmission gear 40 are moved to their respective intermediate positions close to gear 50 on supply reel mount 48 and gear 43 on the shaft of fly wheel 42. Subsequently, first and second transmission gears 37 and 40 are instantaneously engaged with gears 50 and 43, respectively. Thus, the incomplete engagement between the gears, or gear noise is prevented in the rewind operation of the tape recorder.

Figure 4:
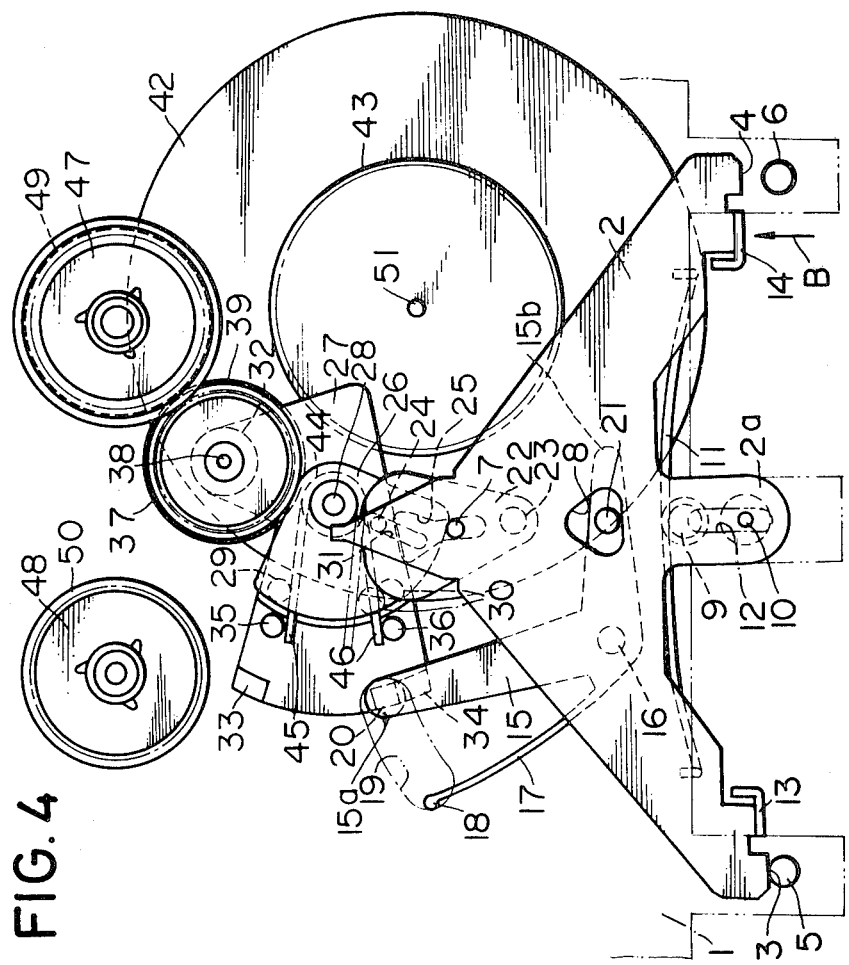
FIG. 4 is a plan view of the gear-driven change-over mechanism in an intermediate position between the rest position and the fast-forward mode.

Next, the operation from the rest position shown in FIG. 1 will be described with reference to the depression of the fast-forward push-button 14'. When this push-button is initially depressed actuating portion 14 of main lever 2 is pushed in the direction shown by arrow B. The right corner portion 4 of main lever 2 is separated from its engagement with pin 6 extending from chassis 1 and main lever 2 is rotated to the position shown in FIG. 4 in the counter-clockwise direction about the contact point between left corner portion 3 of main lever 2 and pin 5 extending from chassis 1 against the urging of torsion spring 11 wound on pin 9. In this rotation main lever 2 is guided by the engagement of pin 10 within oblong hole 12 into which pin 10 is loosely fitted. Drive plate 22 is also rotated in the counter-clockwise direction as viewed in FIG. 4 about support pin 23 with pin 7 fitted into guide hole 25 of drive plate 22. With the counter-clockwise rotation of the drive plate 22, rotary plate 26 is rotated in the clockwise direction about common shaft 28 by the engagement of pin 24 with oblong hole 31 of rotary plate 26. With the rotation of rotary plate 26 pin 30 extending from rotary plate 26 pushes leg 46 of spring 44 to rotate the latter in the clockwise direction about shaft 28. Accordingly, pin 35 of transmission plate 27 is pushed by leg 45 of spring 44 to rotate transmission plate 27 in the clockwise direction about shaft 28. The rotation of transmission plate 27 is temporarily interrupted by the engagement of projection 34 on transmission plate 27 with stop 20 fixed on the top of stop lever 15 as shown in FIG. 4. In this state as shown in FIG. 4, first transmission gear 37 supported on transmission plate 27 is placed into an intermediate position close to gear 49 of take-up reel mount 47 and third transmission gear 39 similarly supported on transmission plate 27 is also placed in an intermediate position close to gear 43 fixed on the shaft supporting fly wheel 42. The lower side of triangular opening 8 in main lever 2 is also put into an intermediate position close to pin 21 extending from end 15b of stop lever 15.

With the continued depression of the fast-forward push-button 14' main lever 2 rotates further in the counter-clockwise direction about the contact point between left corner portion 3 and pin 5 extending from chassis 1. However, transmission plate 27 is prevented from rotating by the engagement of projection 34 on transmission plate 27 with stop 20 on stop lever 15. Accordingly, with the continued rotation of main lever 2 only rotary plate 26 is rotated in the clockwise direction about shaft 28 through drive plate 22 so that leg 46 of spring 44 is pushed by pin 30 of rotary plate 26. However, spring 44 does not rotate about shaft 28 since leg 45 of spring 44 is stopped by pin 35 on transmission plate 27 which is prevented from rotating. Accordingly, leg 46 of spring 44 bends in the manner shown by the dot-dash line in FIG. 4.

With the rotation of main lever 2 while leg 46 of spring 44 bends pin 21 fixed on end 15b of stop lever 15 moves into engagement with the lower side of triangular opening 8 in main lever 2 and pin 21 is pushed upwardly as viewed in FIG. 4 by the lower side of triangular opening 8 in main lever 2 to rotate stop lever 15 in the counter-clockwise direction about its support pin 16 against the spring action portion 17. The contact area between projection 34 of transmission plate 27 and stop 20 of stop lever 15 gradually decreases with the rotation of stop lever 15 while transmission plate 27 is prevented from rotating. As a result leg 46 of spring 44 bends more and more with the decrease of the contact area between projection 34 and stop 20.

With the still further rotation of main lever 2 stop lever 15 is also further rotated to disengage projection 34 on transmission plate 27 from stop 20 on stop lever 15. Accordingly, transmission plate 27 now rotates in the clockwise direction due to the energy charged in spring 44 which now causes transmission plate 27 to rapidly rotate in the clockwise direction. With the rapid rotation of transmission lever 27 first transmission gear 37 is instantaneously engaged with gear 29 of take-up reel mount 47 and substantially at the same time, third transmission gear 39 is instantaneously engaged with gear 43 fixed on the shaft supporting fly wheel 42, as shown in FIG. 5.

Figure 5:
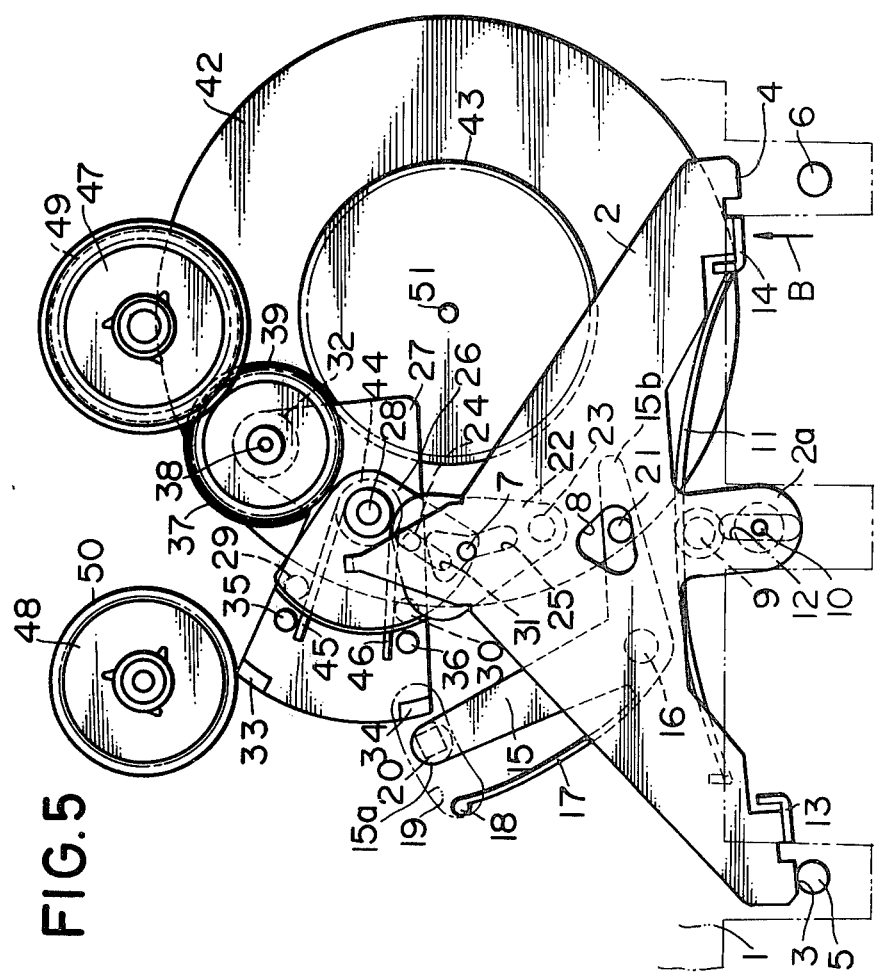
FIG. 5 is a plan view of the gear-driven change-over mechanism in the fast-forward mode.
Figure 6:
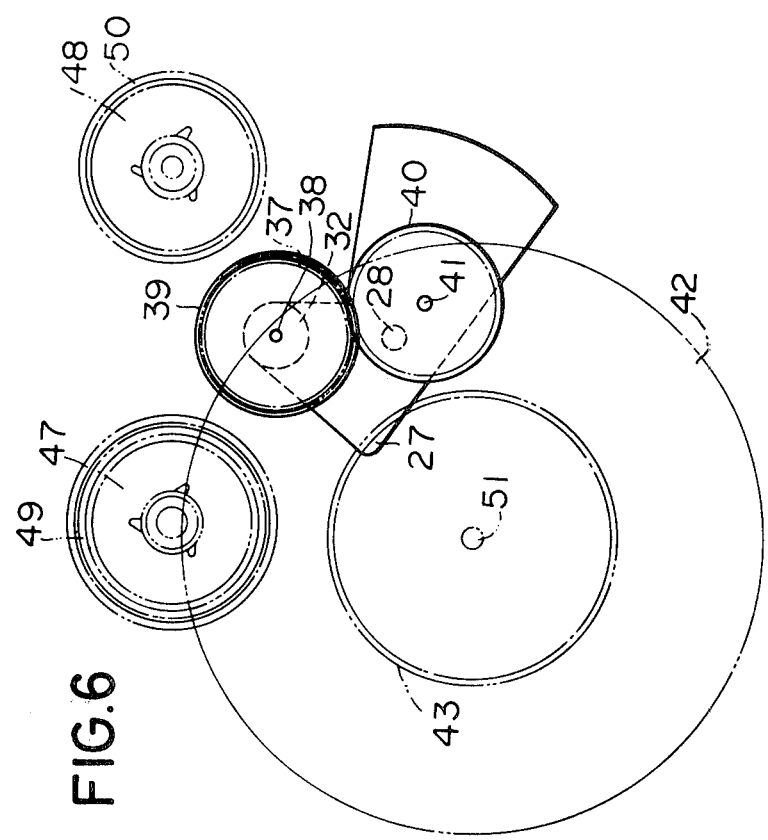
FIG. 6 is a bottom view of the gear-driven change-over mechanism.

In the fast-forward state of the gear-driven change-over mechanism shown in FIG. 5, the rotation of fly wheel 42 is transmitted through gears 43, 39, 37 to gear 49 of take-up reel mount 47 which then rotates at a high speed to take-up tape in the recorder.

When the fast-forward push-button 14' is released from its depressed state in the fast-forward condition shown in FIG. 5, main lever 2 is rotated clockwise back to its original position under the urging of torsion spring 11. Accordingly, drive plate 22, interconnected through pin 7 and guide hole 25 with main lever 2, is also rotated in the clockwise direction back to its original position and thus rotary plate 26 and transmission plate 27 are also rotated in the counter-clockwise direction back to their respective original positions. As a result, first transmission gear 37 is disengaged from gear 49 of take-up reel mount 47 and third transmission gear 39 is disengaged from gear 43 fixed on the shaft of fly wheel 42. In addition, stop lever 15 is rotated in the clockwise direction back to its original position shown in FIG. 1 under the urging of spring action portion 17, since pin 21 fixed on end 15b of stop lever 15 is released from its engagement with the lower side of triangular opening 8 in main lever 2.

As described above, when the fast-forward push-button 14' is pushed to rotate main lever 2 from its original position shown in FIG. 1 to its operative position shown in FIG. 5, initially first transmission gear 37 and third transmission gear 39 are moved to their respective intermediate positions close to gear 49 of take-up reel mount 47 and gear 43 fixed on the shaft of fly wheel 42. Subsequently, first and third transmission gears 37 and 39 are instantaneously engaged with gears 49 and 43, respectively. Thus, the incomplete engagement between the gears, or gear-noise is prevented in the fast-forward operation of the tape recorder.

While a preferred embodiment of this invention has been described, obviously further modifications and variations are possible in light of the above teachings. It is therefore to be understood that within the scope of the appended claims, the invention may be practised otherwise than as specifically described.

The above-described embodiment has been described as being applicable to a tape recorder. However, this invention may be applied to any gear-driven change-over mechanism for any other apparatus. Either of the gears 39 and 40 may be omitted from the gear-driven change-over mechanism in some apparatus. In the above-described embodiment transmission gear 37 is an idler gear while gear 43 fixed on the shaft of fly wheel 42 is a drive gear. However, it is to be expressly understood that transmission gear 37 may be used as a drive gear as well. Further, the gear-driven change-over mechanism may be so designed as to engage transmission gear 37 simultaneously with two gears with the depression of the push-button.

What is claimed is:

1. A gear-driven change-over mechanism adapted to operate responsive to the selective depression of one of a plurality of push-button members comprising:

an operating member movable from a first position through an intermediate position to a second position upon depression of one of said push-button members, a rotary member operatively interconnected with said operating member and rotatably mounted for rotation from a first position to a second position upon movement of said operating member from its said first position to its said second position, a rotatably mounted transmission member rotatable between first and second positions, spring means interconnected between said rotary member and said transmission member whereby said transmission member is rotated by said spring means when said rotary member rotates, a first gear member operatively supported by said transmission member, a stop member operatively associated with said operating member and movable with the movement of said operating member, said stop member including means engageable with said transmission member to stop the rotation of said transmission member, and a second gear member said transmission member being rotatable between its said first position and its said second position upon movement of said operating member from its said first position to its said intermediate position wherein said stop member engages said transmission member to hold said transmission member in its said second position while said rotary member continues to rotate to its said second position against the urging of said spring means as said operating member moves from its said intermediate position to its said second position, and means to release said operating member from its said second position to release said stop member from engagement with said transmission member whereby said spring means urges said transmission member to rotate from its said second position to its said first position to move said first gear into rapid engagement with said second gear.

2. A gear-driven change-over mechanism according to claim 1 wherein said mechanism further comprises a third gear member spaced from said second gear member and said operating member is movable from said first position through a second intermediate position to a third position upon depression of a second one of said push-button members in a direction opposite to the direction of movement of said operating member responsive to the depression of said one of said push-button members and wherein said rotary member and transmission member rotate from said first position to a third position respectively upon movement of said operating member from its said first position to its said third position in a direction opposite to the direction of rotation responsive to the depression of said one of said push-button members thereby to selectively engage said first gear member with said third gear member.

3. A gear-driven change-over mechanism according to claim 2 wherein said first and second mentioned push-button members correspond to rewind and fast-forward push buttons for a tape recorder and wherein said second and third gear members are fixed on a supply reel mount and a take-up reel mount for said tape recorder, respectively.

4. A gear-driven change-over mechanism according to claim 3 wherein said mechanism further comprises a fourth gear member operatively supported by said transmission member in engagement with said first gear member and a fifth gear member fixed on a capstan shaft of said recorder and wherein said fourth gear member is rapidly moved into engagement with said fifth gear member upon movement of said operating member responsive to depression of any of said push-button members.

5. A gear-driven change-over mechanism for a tape recorder adapted to operate responsive to the selected depression of one of a plurality of push-button members comprising:
an operating member moveable in response to the depression of one of said push-button members from a first position through an intermediate position to a second position,
a lever rotatably mounted on said operating member and being rotatable responsive to movement of said operating member from a first position through an intermediate position to a second position,
at least one gear member rotatably supported on said lever,
spring means engaged against said operating member and said lever,
a stop member engageable with said lever to stop movement of said lever when said lever and said operating member move to their said respective intermediate positions,
a second gear member, and means for moving said stop member from engagement with said lever upon continued movement of said operating member from its said intermediate position to its said second position whereby said first gear member is moved into operative engagement with said second gear member.

6. A gear-driven change-over mechanism according to claim 5 wherein said operating member includes said means for moving said stop member from engagement with said lever.

7. A gear-driven change-over mechanism according to claim 6 wherein said stop member is made from a plastic material and includes a rigid portion for engagement with said lever and an elastic spring action portion to bias said rigid portion into engagement with said lever.

* * * * *